Nov. 6, 1934.    F. N. G. KRANICK    1,979,945
MANURE LOADER AND SPREADER
Filed Nov. 12, 1931    2 Sheets-Sheet 1
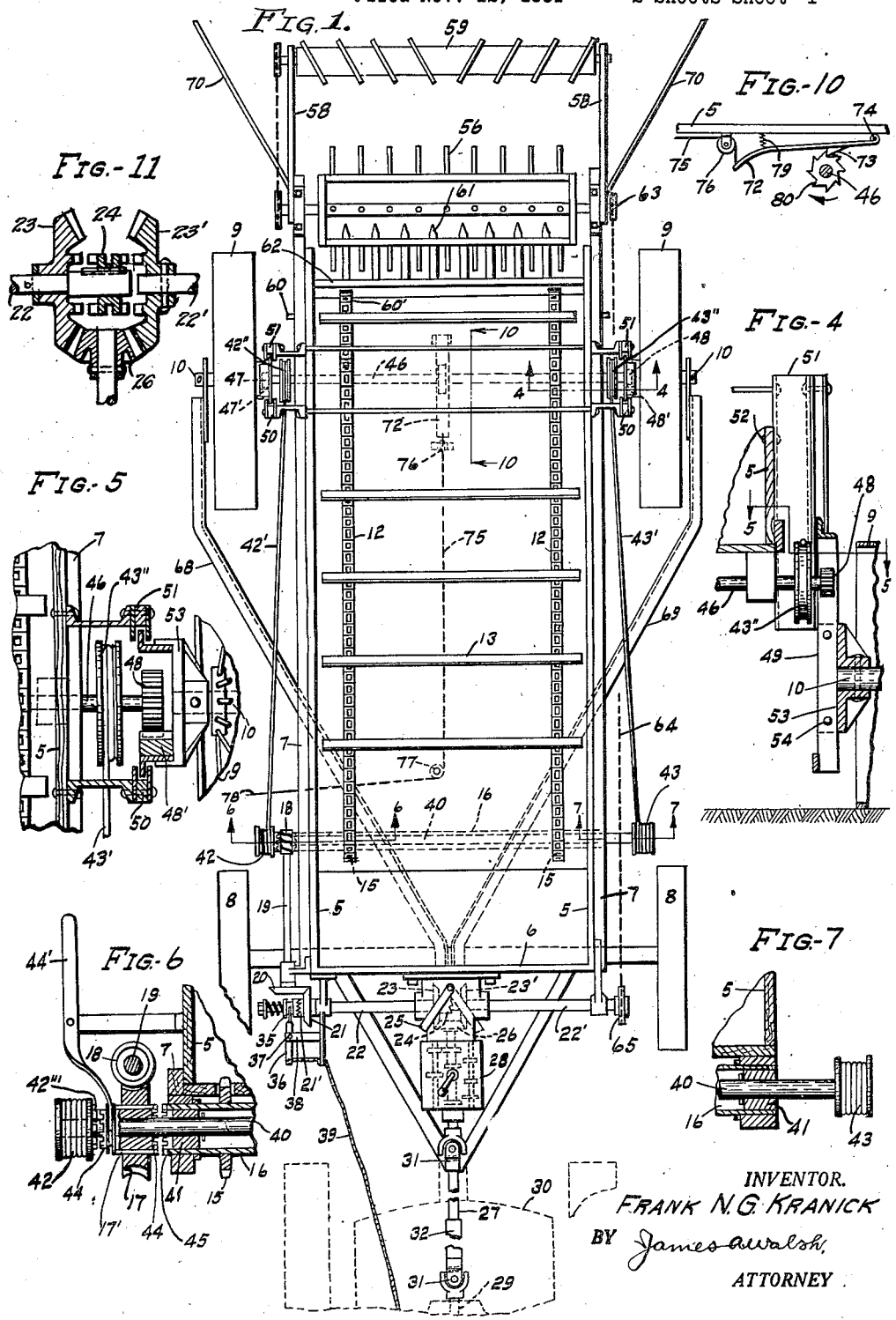
INVENTOR.
FRANK N. G. KRANICK
BY James A. Walsh,
ATTORNEY Nov. 6, 1934.   F. N. G. KRANICK   1,979,945
MANURE LOADER AND SPREADER
Filed Nov. 12, 1931   2 Sheets-Sheet 2
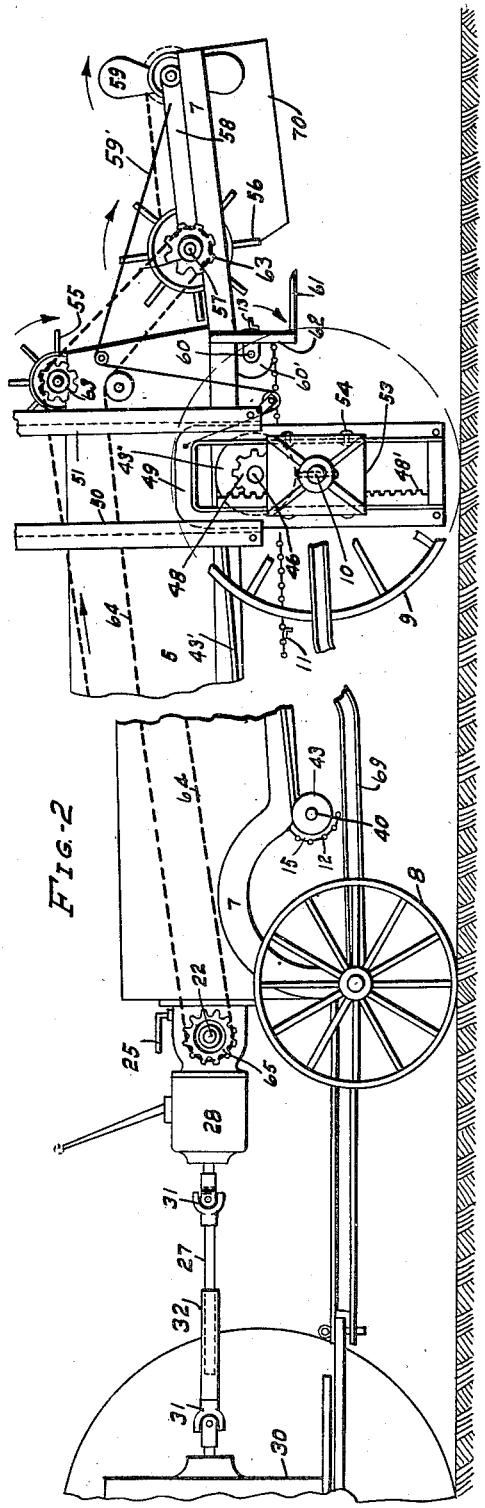
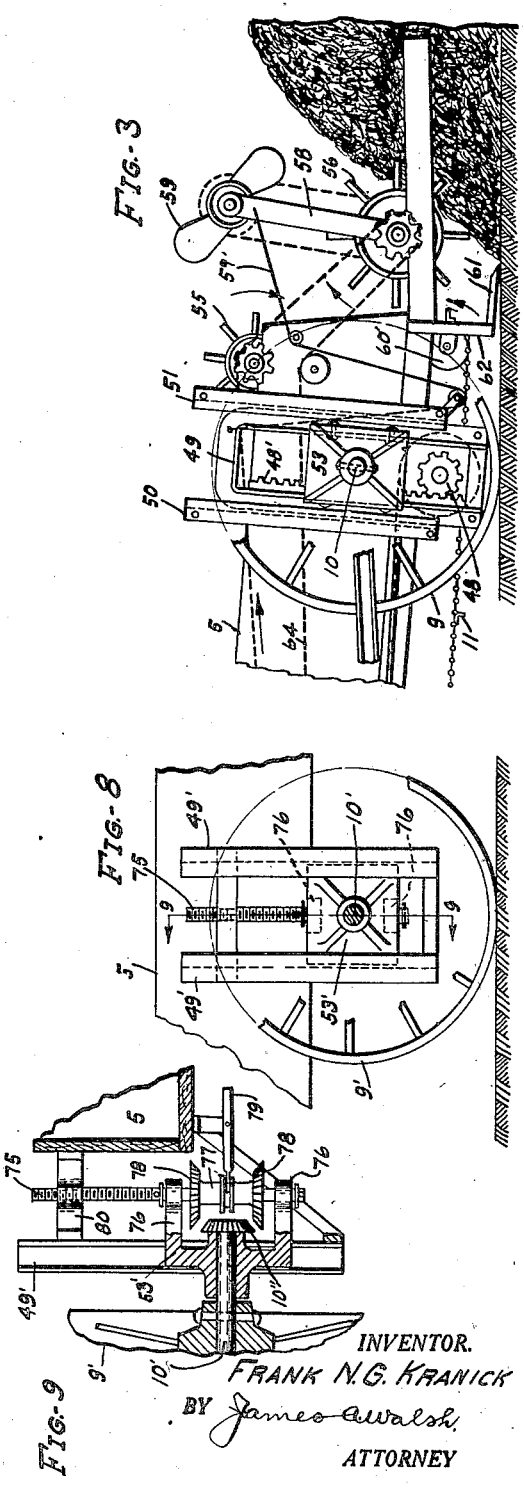
INVENTOR.
FRANK N. G. KRANICK
BY James A. Walsh
ATTORNEY Patented Nov. 6, 1934

1,979,945

UNITED STATES PATENT OFFICE 1,979,945

MANURE LOADER AND SPREADER

Frank N. G. Kranick, Racine, Wis., assignor to J. I. Case Company, Racine, Wis., a corporation Application November 12, 1931, Serial No. 574,473

13 Claims. (Cl. 275—1)

My invention relates to improvements in that type of vehicles employed for manure spreading and the like into which material is manually loaded and then spread over the ground by distributing devices usually actuated by the moving vehicle, it being my object to provide such a vehicle drawn and operated by tractor or other power and which will serve first as a self-loading vehicle and then as a distributor of its load, whereby I materially facilitate the spreading operations, as the vehicle when loaded and the material distributed may be returned to the source of supply and quickly reloaded by mechanical means, thus dispensing with the comparatively slow methods of forking, piling and leveling commonly now widely employed.

In the accompanying drawings, forming part hereof, Figure 1 is a plan view of a vehicle embodying my improvements; Figs. 2 and 3, fragmentary side elevations showing varied adjustments of parts of the vehicle; Fig. 4, a detail section taken on the dotted line 4—4 in Fig. 1; Fig. 5, a detail section on the dotted line 5—5 in Fig. 4; Figs. 6 and 7, detail sections taken on the dotted lines 6—6 and 7—7, respectively, in Fig. 1; Fig. 8, a detail of a modified construction adapted for use on horse-drawn vehicles; Fig. 9, a detail section taken on the dotted line 9—9 in Fig. 8; Fig. 10 a section on the dotted line 10—10 in Fig. 1, and Fig. 11 is an enlarged detail of the actuating mechanisms for the conveyor and other elements.

In carrying out my invention I employ a box-like vehicle comprising side and end walls 5, 6, sills 7, and forward and rear carrying wheels 8, 9, respectively, which latter are mounted on stub axles 10, the bottom or bed of the box being provided with an endless conveyor 11, Fig. 2, comprising chains 12 and cross slats 13, Fig. 1, of well known construction and adapted to travel about said bed.

The forward end of the conveyor 11 is mounted on sprockets 15 carried by a hollow shaft 16, while the rear end thereof, as is common, is mounted on similar sprockets, a roller or otherwise, so that the conveyor may be driven freely in forward or rearward directions by a worm wheel 17, Fig. 6, engaging a worm 18 on shaft 19, the latter having a bevel gear 20 at its opposite end meshing with a freely running bevel gear 21 mounted on shaft 22, which latter is in alignment with shaft 22', the direction of rotation of which shaft 22 is controlled by clutch gears 23 and 23' and a clutch member 24 slidably mounted on shaft 22 and adapted to engage with either of said clutch gears as will further appear.

The shaft 22' carries a gear 23' fixedly secured thereto, both rotating in the same direction, that is, toward the conveyor while the latter is either in unloading or loading motion, and which gear co-acts with gear 23 to rotate shaft 22 in reverse directions from shaft 22' through manipulation of clutch member 24 keyed to shaft 22 and adapted to slide across the meeting ends of shafts 22, 22', and which clutch is controlled by a lever 25 in a well known manner for such purpose. Said gears 23, 23', are controlled by the lever 25 and are driven by a bevel gear 26 mounted on a flexible power take-off shaft 27 running through a speed changing gear-box 28 of any desired construction and arrangement for varying the speed of the vehicle actuating mechanisms, the shaft 27 being connected to the power shaft 29 of a tractor 30 by universal joints 31 and telescoping section 32 as is common. The gear 21 has a clutch member 21' adapted to be engaged and disengaged by a yieldingly mounted clutch 35 through the shifting of a lever 36, pivotally mounted at 37, to an arm 38, and the end of which lever is connected by a rope 39 under control of the tractor operator so that the gear 21 may be declutched when it is desired to cease the traveling operation of the conveyor and again clutched to actuate the conveyor in forward or reverse direction according to the direction of rotation of shaft 22 as determined by the clutching of either of the gears 23, 23', with clutch 24.

An inner shaft 40 is mounted in the hollow shaft 16 by suitable bearings 41, and each end of said shaft 40 carries a windlass 42, 43, fixedly secured thereto, the windlass 42 comprising a clutch member 42''' adapted to engage one end of a double clutch 44, 44, which is freely mounted on shaft 40 and controlled by lever 44' in such manner that said clutch may be engaged with clutch 42''' so as to cause rotation of shaft 40, or rotate idly, or cause rotation of shaft 16 by engaging clutch 44 with clutch 45, as the operator desires. Clutch 44 is slidably mounted in worm gear 17 by splines 17' or otherwise, and which clutch can be moved laterally on shaft 40 without causing worm gear 17 to move out of engagement with worm 18, said worm gear being suitably held in position by common means. On each of the windlasses 42, 43, a cable 42', 43' is wound and extends rearwardly and connected to drums 42'', 43'', mounted on a shaft 46, said shaft having pinions 47, 48, at its ends engaging racks 47', 48'. As clearly indicated in Fig. 2, each rack, as 48', is securely fastened to or forms a part of an axle-bearing holder 49 of U shape or other desired form, and mounted in a sliding guide 50, 51, secured to the box 5, as at 52, Fig. 4. Secured to said holder 49 is a support or axle bearing 53, preferably a reinforced casting, fixed to the holder by rivets 54 or otherwise, in which support the stub axle 10 is mounted, it being understood that said guides, holders, supports and stub axles at each side of the vehicle are duplicates.

At the rear of the vehicle I provide toothed spreader cylinders 55, 56, as is common, and upon shaft 57 of cylinder 56, supported on the sills 7, I pivotally connect the arms 58 of a distributor 59 which may be adjusted from the horizontal position indicated in Fig. 2 to the vertical position shown in Fig. 3, for a purpose to appear. Adjacent cylinder 56 and supported by sills 7 is the rear conveyor shaft 60, carrying sprockets 60' and conveyor 11, rotating and cooperating with cylinder 56, as indicated by arrows in Figs. 2 and 3, and the cross-slats 13 of the conveyor are preferably so mounted as to extend over a loosening shovel 61 supported by frame 62 connected to sills 7. The shafts of the rotary cylinders 55 and 56 are provided with sprockets 63 actuated by a drive chain 64 engaging the sprockets, the forward turn of the chain being mounted on a drive sprocket 65 on shaft 22' to rotate the toothed cylinders in accordance with the direction of rotation of said shaft. It will also be understood that I provide the vehicle with fenders 68, 69, connected to the stub axles 10 and converging at their forward ends and suitably connected to the vehicle, by which means the vehicle is protected from damage when contacting with posts and the like, which are pushed aside or the vehicle sufficiently deflected so that such obstructions may not enter between a rear wheel and the vehicle body to cause damage or breakage to the axle supports and parts associated therewith. These fenders 68 and 69 also act as tension members transmitting part of the drawbar pull to the rear wheels directly. And at the rear of the vehicle, preferably secured to the sills 7 thereof, wings or guides 70 are provided, which confine the material as the vehicle is being backed and loaded, so that the cylinder 56 may effectively pick up and deliver such material onto the conveyor.

When it is desired to load the vehicle the body thereof is lowered by engaging clutch 44 (shown in Fig. 6 in neutral position and therefore idling) with clutch member 42''' to rotate shaft 40 and the windlasses 42 and 43 in the direction to unwind cables 42' and 43', which is accomplished by manipulating lever 44', whereupon the inner shaft 40 starts to rotate with worm gear 17. The rotation of shaft 40 permits cables 42' and 43' to unwind from windlasses 42, 43, and wind about drums 42'', 43'', thereby causing shaft 46 to rotate, which winding action is produced by the weight of the vehicle body as it instantly begins to lower when the cables are thus released. As said shaft 46 carries the pinions 47, 48, engaging the racks 47', 48', the rotation of the shaft will cause the pinions to travel downwardly on said racks and thereby lowering the body to the position indicated in Fig. 3. When thus lowering the body the distributor 59 is automatically swung, by means of cable 59' connecting the same to the holder 49, to the position indicated in Fig. 3, and the vehicle then backed so that the shovel 61 will penetrate and loosen the material to be loaded. The chain 64 will then be driven to actuate cylinders 55 and 56, the arms 58 being held in fixed position as indicated in Fig. 3, said chain rotating the cylinders in such direction as is best suited in cooperation with the rear end of slatted conveyor 11 to pick up the material and throw it into the conveyor. A lever 72 including a pawl 73, Fig. 10, is pivotally secured, at 74, to the bottom of the body, and connected to said lever is a rope 75, guided by pulleys 76, 77, Fig. 1, which rope extends, as at 78, to within convenient reach of an operator. A spring 79 constantly urges lever 72 downwardly so that pawl 73 will be engaged with a ratchet wheel 80 fixedly mounted on shaft 46 and the vehicle body thus sustained in raised position. As the body is to be lowered the power is engaged in the manner explained, and rope 75 pulled, whereupon pawl 73 will be disengaged from ratchet wheel 80 to permit shaft 46 to rotate in the direction of the arrow and thereby causing pinions 47, 48, to travel downwardly on the racks as before described. When the body is in the desired lower position the clutch 44 is released from clutch 42''' by lever 44' and the rope 75 released so that pawl 73 and wheel 80 will be reengaged. Shaft 22 is then adjusted by clutch 24 so that the worm shaft 19 will rotate to cause the conveyor 11 to travel toward the front end of the body and to carry the material forwardly so that it will become packed, and to avoid uneven masses or shallow loading of the material the conveyor may be caused to intermittently stop and start by disengaging and reengaging clutch 35 in relation to bevel gear 21, which, as stated, is accomplished by manipulating rope 39 under control of the tractor operator. It will be understood, therefore, that the vehicle is being constantly backed so that the material will be confined by the wings or guides 70 and picked up by cylinder 56 and by the latter thrown onto the conveyor 11 in the manner described and carried forwardly to be accumulated into a load.

When it is desired to raise the body from its lowered position it is but necessary to regulate shaft 22 by means of clutch 24 so as to rotate in the proper direction, and then engage clutch members 42''' and 44 when the body has reached the desired height, the stop mechanism described requiring no attention from the operator as the body is being raised as the ratchet and pawl mechanism 73, 80, will retain the body when stopped. When the body has been loaded and then raised in the manner described the distributor 59 will be automatically returned to the position indicated in Fig. 2, and the vehicle then drawn to the field for discharging and scattering the load by the rotation of cylinders 55 and 56 in the same direction as when loading as indicated by the arrows in Fig. 2, while at the same time the conveyer will travel rearwardly and carry the material within the influence of the cylinders, which scatter it more or less, and deliver portions thereof to distributor 59 to be more widely scattered.

As above described, my improvements are applicable to a power propelled and operated loader and unloader, but it will be understood that by slight modification a horse-drawn vehicle of the character may be provided with similar or equivalent means whereby the vehicle body may be raised and lowered, which modified form is indicated in Figs. 8 and 9. In said construction the wheel 9' is fixedly secured to the stub axle 10', the inner end of which axle is provided with a bevel gear 10'', said shaft being supported in the axle-bearing 53' seated in a guide 49' secured to the body 5. Said axle-bearing supports a screw-shaft 150

75, at 76, and has mounted thereon a shifting collar 77 having bevel gears 78 adapted to be shifted into engagement with gear 10″ by means of a lever 79, the screw shaft at its upper end being supported in a threaded brace 80. A similar assemblage of mechanisms is associated with the opposite wheel, and the levers 79 may be controlled by the operator in any suitable manner. When the vehicle is drawn forwardly it will be seen that wheel 9′ drives the bevel gear 10″, and when the appropriate gear 78 is brought into engagement therewith the screw-shaft will be rotated to raise the body 5 into proper position for transportation and unloading and distributing purposes, and when the body is to be lowered for loading purposes the adjustment of the collar 77 is reversed so that a gear 78 will engage bevel gear 10″ to rotate screw-shaft 75 in a reverse direction, whereby guide 49′ will slide downwardly to carry the body into such lowered position as may be desired. In such construction, as well as that shown in Figs. 1 to 7, it will be noted that I employ stub axles for the rear wheels, by which construction and arrangement ample space is provided beneath the vehicle so that the range of movement thereof in raising and lowering is entirely unobstructed, and which is an important feature of my improvement.

In the manner described I provide a combination loading and unloading vehicle for the purposes stated which may be conveniently positioned to be loaded, whereby material, such as manure and the like, may be mechanically removed in an expeditious manner and automatically loaded, conveyed from the source of supply and unloaded and effectively distributed, either by tractor or other power, at a considerable saving in time, labor and expense.

I claim as my invention:

1. In a combined manure loader and spreader, a receptacle, a conveyer in the receptacle, supporting wheels, stub axles upon which the wheels are mounted, means for raising and lowering the receptacle in relation to said axles, means for actuating the conveyer forwardly to load and rearwardly to unload said receptacle, means for actuating the conveyor intermittently, and means for loading the receptacle as the conveyer moves forwardly and for distributing material as the conveyer moves rearwardly and unloads the receptacle.

2. In a combined manure loader and spreader, stub axles at opposite sides thereof, a receptacle supported on the axles, sliding means on the receptacle adapted to be moved vertically in relation to the axles for lowering the receptacle into loading position and raising the same to unloading position, means for actuating said sliding means, a conveyer in the receptacle, means for actuating the conveyer to move forwardly for loading and rearwardly for unloading the receptacle means for actuating the conveyor intermittently, and means cooperating with the conveyer for loading material into the receptacle and for distributing material as it is being unloaded by the conveyer.

3. In a combined manure loader and spreader, supporting wheels, stub axles upon which the wheels are mounted, a receptacle supported by the wheels, a conveyer in the receptacle, means for actuating the conveyer in forward and reverse directions, means for raising and lowering the receptacle in relation to said axles, means for actuating the conveyer forwardly when loading and rearwardly when unloading the receptacle, means for actuating the conveyer intermittently, and means cooperating with the conveyer for loading material into the receptacle and also for distributing material as it is being unloaded by the conveyer said means rotating in the same direction during the operations of loading and distributing material.

4. In a combined manure loader and spreader, a receptacle, a conveyor in the receptacle, means for lowering the receptacle into loading position, means for actuating the conveyor to carry material into the receptacle, means for actuating the conveyor intermittently, means for adjusting the lowering means to elevate the receptacle into unloading position, means for adjusting the conveyor actuating means to reverse the direction of travel of the conveyor to unload material, and rotatable means at one end of the receptacle for loading material thereinto and distributing the material as it is being unloaded by the conveyer.

5. In a combined manure loader and spreader, a receptacle, a loading and unloading conveyor in the receptacle, means for actuating the conveyor in reverse directions, means for controlling the conveyor to intermittently move material forwardly in the receptacle, means whereby the receptacle may be raised and lowered, means for actuating said latter means, means for loading the conveyor, and means for actuating the loading means to distribute material discharging from the conveyor.

6. In a combined manure loader and spreader, an axle bearing, a stub-axle therein, means in which said bearing is supported, a rack associated with said latter means, a receptacle having a guide adapted to slide on said bearing support, a pinion on the receptacle engaging said rack, means for actuating the pinion to travel on the rack for raising and lowering the receptacle, a conveyer in the receptacle, and means at one end of the receptacle for loading material thereinto and distributing the material as it is being unloaded by the conveyer.

7. In a combined manure loader and spreader, an axle bearing, a stub-axle thereon, a receptacle, a guide on the receptacle movable in relation to the bearing, means associated with said bearing for raising and lowering the receptacle, means for automatically actuating the raising and lowering means, a conveyer in the receptacle, means for actuating the conveyer forwardly for loading and rearwardly for unloading the receptacle, and means for propelling material onto the conveyer for loading the receptacle and for distributing the material as it is being unloaded by the conveyer.

8. In a combined manure loader and spreader, a receptacle, a windlass on the receptacle, a drum on the receptacle, a cable on the windlass and connected to the drum, a pinion adjacent the drum, a rack with which said pinion engages, an axle bearing connected to the rack, a wheel on the axle bearing, and means for rotating the windlass to unwind the cable from the windlass and wind said cable about the drum whereby the weight of the receptacle will cause the pinion to traverse the rack and lower the receptacle in relation to the axle bearing.

9. In a combined manure loader and spreader of the character described, a receptacle, a shaft on the receptacle, windlasses on the shaft, a rear shaft on the receptacle carrying drums, cables wound upon the windlasses and connected to the drums, pinions on said drum shaft, wheel supported means engaging with said pinions, and means for rotating the windlass shaft to unwind the cables from the windlasses and wind said cable about the drums for lowering the receptacle and for also reversing rotation of said shaft to wind said cables on the windlasses for raising the receptacle in relation to the wheel-supported means.

10. In a combined manure loader and spreader embodying a receptacle, driven shafts each having a bevel gear thereon, a driving shaft having a gear thereon adapted to engage said gears, a clutch for engaging the bevel gears to rotate one of the driven shafts in either direction, rotary elements on the loader and spreader connected to the other of said driven shafts and rotated thereby, a windlass on the loader and spreader, means engaging said first mentioned driven shaft for rotating the windlass, a drum on the loader and spreader, flexible means wound upon the windlass and drum, a wheeled axle supporting the loader and spreader, and means for controlling the first mentioned driven shaft and the windlass whereby the flexible means on the windlass will be unwound and wound about the drum to lower the receptacle and again rewound to raise said receptacle.

11. In a combined manure loader and spreader embodying a receptacle, a conveyor in the receptacle embodying chains and slats, a hollow shaft, sprockets on the shaft on which the chains are mounted, an inner shaft in the conveyor shaft, a clutch on the inner shaft adapted to engage the conveyor shaft, means for engaging and disengaging the shafts, means for rotating the conveyor shaft when said shafts are disengaged to actuate said conveyor, and means for causing the inner shaft to actuate other elements on the loader and spreader.

12. In a combined manure loader and spreader embodying a receptacle, a driven shaft, means for rotating the shaft in reverse directions, a clutch controlled bevel gear on the shaft, means for engaging and disengaging the clutch, a conveyor driving shaft having a gear adapted to be engaged with said bevel gear, a worm on said latter shaft, a conveyor shaft engaging said drum, a conveyor connected to and driven by said conveyor shaft, an inner shaft in said conveyor shaft, a windlass on each end of the inner shaft, a clutch on the inner shaft adapted to engage the conveyor shaft or the inner shaft alternately, means for actuating the clutch, a drum at opposite sides of and adjacent the rear end of the conveyor, a cable connecting the windlasses and drums, wheels having stub-axles associated with said receptacle and drums, and means for rotating the windlass shaft to unwind the cables from the windlasses and wind said cables about the drums for lowering the receptacle and also for reversing rotation of said shaft to wind said cables on the windlasses for raising the receptacle in relation to the wheel supporting means.

13. In a combined manure loader and spreader including a conveyor and rotary material handling means connected therewith, means for actuating the conveyor in reverse directions, means for actuating the conveyor intermittently, means for actuating the material handling means to rotate in one direction only, and means on the vehicle for preventing contact of obstructions with parts thereof.

FRANK N. G. KRANICK.